Oct. 28, 1958 H. T. BONNER 2,858,386
REMOTELY CONTROLLED ESCAPEMENT MECHANISM FOR MODEL AIRPLANES
Filed March 17, 1955 2 Sheets-Sheet 1

INVENTOR.
HOWARD T. BONNER
BY Elliott & Pastoriza
ATTORNEYS

Oct. 28, 1958 H. T. BONNER 2,858,386
REMOTELY CONTROLLED ESCAPEMENT MECHANISM FOR MODEL AIRPLANES
Filed March 17, 1955 2 Sheets-Sheet 2

*INVENTOR.*
HOWARD T. BONNER
BY *Elliott & Pastoriza*
ATTORNEYS

United States Patent Office 2,858,386
Patented Oct. 28, 1958

2,858,386

REMOTELY CONTROLLED ESCAPEMENT MECHANISM FOR MODEL AIRPLANES

Howard T. Bonner, Los Angeles, Calif.

Application March 17, 1955, Serial No. 495,017

9 Claims. (Cl. 200—33)

This invention relates generally to signal-actuated control apparatus, and more particularly to escapement mechanisms for radio-controlled devices in which changes of control positions are effected by remotely transmitted signals. The escapement mechanism of the present invention has specific features, in the embodiment shown and described, of importance to model airplane operation; however, it will be apparent that the basic inventive structure may also be advantageously used in other apparatus.

Escapement mechanisms are employed in model airplanes to control the rudder position in response to electrical signals transmitted by a human operator on the ground. Towards this end, they usually include an electromagnet, solenoid, or the like designed to be energized through conventional circuitry in the plane when a given electrical frequency is received. The electromagnet or its counterpart is then used as a means of regulating a control device, which in turn governs the operation of a driving energy source that mechanically actuates the rudder to the desired position. Thus, the escapement mechanism permits the use of a low energy radio signal to control selective actuation of the rudder by the driving energy source in the airplane. From the standpoint of economical manufacture, the driving energy source usually takes the form of stored potential energy in a twisted rubber band, although small electrical motors and spring-wound devices are sometimes used.

Escapement mechanisms for model airplanes must, of necessity, have relatively small overall dimensions, and they must similarly meet relatively low weight requirements in order that the maneuverability of the plane will not be impaired. It is equally important that the mechanism be susceptible of economical construction under conditions of precision manufacturing.

There have been certain difficulties experienced in an endeavor to achieve these results, most of which are related to the control device normally physically interposed between the electro-magnet and the direct rudder controls of the airplane. This control device must not only serve as a means of converting the electrical energy into a mechanical actuation, but it must also serve as a means of transmitting and controlling the driving energy with respect to this actuation. Further than this, the control device must not only be effective in operating the rudder to any one of its three positions—that is, left, right, and neutral—in response to a simple signal code from an operator on the ground or other remote location, but it should also desirably have an automatic return to neutral position, whereby a given signal code will always select a predetermined rudder position. In its more useful form, the escapement mechanism should also be adapted to operate other controls in the plane, for example, flaps, bomb drop, brakes, elevator and the like.

It is therefore an object of the present invention to provide an escapement mechanism embodying structural features enabling more economical and more precision type manufacturing.

Another object is to provide an escapement mechanism having a lower weight and smaller overall dimensions than have heretofore been attained in this art.

Another object is to provide an escapement mechanism which will be continuously effective in its operation, and yet which may be controlled by single channel signal pulses from a remote location, regardless of previous signals transmitted.

These and other objects are achieved in the improved escapement mechanism of the present invention by providing actuating means, which in response to a given signal, will operate an arm from a first given position to a second given position. The actuating means are attached to supporting means secured within the plane. A driving shaft is journaled within the supporting means and acts to transmit torque from the driving energy source within the plane to a wheel secured for movement with the driving member. The wheel is normally biased to rotate at a given rate in one direction by the driving energy source.

The wheel and the arm function as the control device, and the wheel structure and its cooperating relationship with the arm is a primary feature of the invention. The wheel has on one of its faces at least one projecting stop on a first given radius, and at least one stop on a second given radius. These stops are positioned such that they will, respectively, engage the arm in its first position and the arm in its second position, thereby checking further movement of the wheel when the arm comes into engagement with the stop. Each stop used will determine a particular control position when it is engaged by the arm. Any form of mechanical linkage, therefore, which responds to the rotation of the wheel is then effective in operating, for example, rudder controls on the airplane.

It will be apparent that by using a plurality of stops on the second given radius, which corresponds to the second position of the arm when actuated by a signal, then several different control positions may be established by a properly timed spacing of the signal pulses. This operation will be described in further detail after the apparatus has been described. In addition, auxiliary contact means may be provided on the wheel which will be effective to open or close circuits on the plane when the wheel's movement has been checked by a particular stop.

These features and other aspects of the invention will be more clearly understood by reference to the following drawings, in which.

Figure 1:
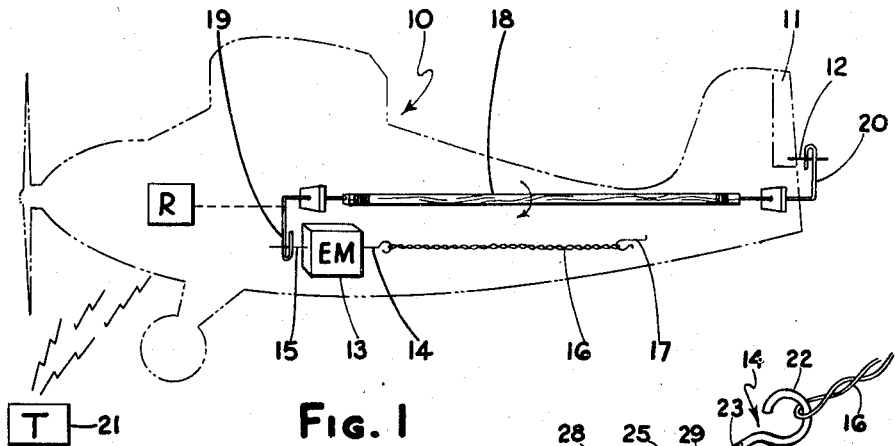
Fig. 1 is a cross-section through a model airplane with the escapement mechanism of the present invention mounted therein.

In Fig. 1, there is shown a model airplane 10 having a rudder 11 and an associated control rod 12. Mounted within the fuselage of the plane 10 is the escapement mechanism of the present invention, schematically shown as a box 13, and including a driving shaft 14 and an off-center control rod 15. The driving shaft 14 is connected to the driving energy source normally provided within the airplane, which in this case is shown as a twisted rubber band 16. One end of the band 16 is connected to the shaft 14 while the other end is suitably fastened within the airplane, as at 17.

A linkage system, designated by the numeral 18, includes one U-shaped end portion 19 positioned to be operated by control rod 15 and similarly another U-shaped end portion 20 positioned to operate the rudder. This linkage system has been shown because of its simple construction; however, any type of linkage which converts the circling motion of control rod 15 into a back and forth movement is adequate.

A transmitter has been schematically represented at 21. The transmitter is manually operated to send signals which are picked up by a receiver R in the plane and relayed to the escapement mechanism 13.

Figure 2:
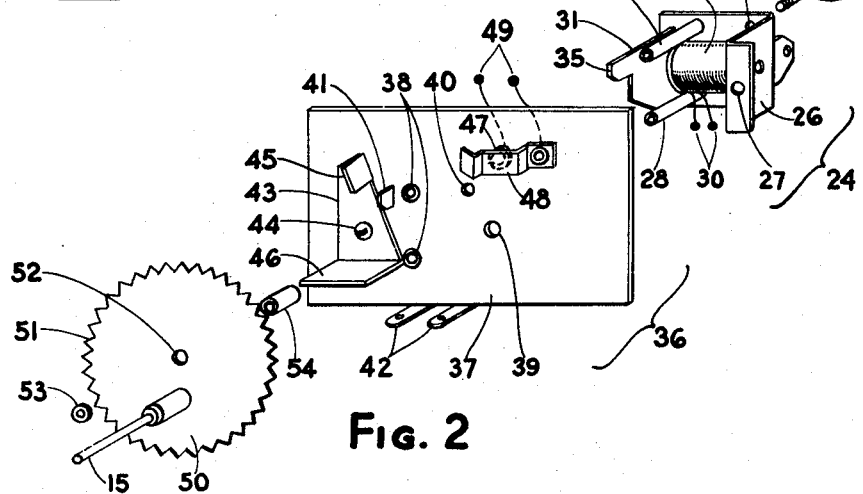
Fig. 2 is an exploded perspective view of the preferred embodiment of the escapement mechanism.

In Fig. 2, the escapement mechanism 13 has been shown disassembled into its major parts. Beginning at the right, there is shown the driving shaft 14 with a hooked end portion 22 for attachment to the twisted rubber band 16. The other end 23 of the driving shaft is threaded for assembly in the escapement mechanism in a manner to be described subsequently.

There is next shown the actuating means for the escapement mechanism, generally designated by the numeral 24, and including a cylindrical type electromagnet 25 in a housing 26. The housing has a hole 27 for riveting to the supporting means of the escapement mechanism as well as braces 28 for the same purpose, in order to give three point stability. A hole 29 is further provided in the housing 26 in order that the driving member 14 may pass therethrough. Coil leads for the electromagnet 25 are indicated at 30. These leads are operatively connected to the receiver R of Fig. 1 and serve to pass energy to the coil 25 when a pulse is received from the transmitter T.

A pole piece 31 is in slotted engagement with the back portion of the housing 26. The pole piece 31 and its operation is more clearly seen in the view of Fig. 4. The pole piece is free to move back and forth a given distance as indicated by the arrows by pivoting in the slots 32 in the housing 26. The pole piece 31 is normally biased towards its solid line position by the force of a spring 33 fastened between the pole piece and a back plate 34. The back plate 34 might be integrally formed with the housing 26, but is here shown as a separate member, secured to the housing as by the riveted braces 28.

Figure 4:
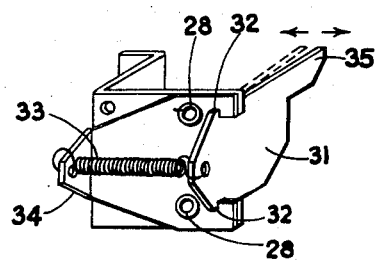
Fig. 4 is a back perspective view of the actuating means of the escapement mechanism.

Upon energization of the electromagnet 25, in response to a signal from the transmitter 21, the magnetic attraction overcomes the spring force and the pole piece 31 and its extending arm 35 will move to the dotted line position in the view of Fig. 4.

Supporting means for the escapement mechanism are shown in Fig. 2 and generally designated by the numeral 36. In the preferred form of the invention, the supporting means comprise a simple rectangular insulating board 37 adapted to be rigidly fixed within the plane fuselage for securing the escapement mechanism in place. The insulating board 37 is provided with suitable apertures at 38 for riveting of the braces 28 and similarly a hole at 39 for riveting directly to the housing 26 at 27. The member 37 also has an opening 40 axially aligned with opening 29 in housing 26, whereby the driving shaft 14 may pass through the supporting means and be journalled therein. The insulating board 37 also includes a retaining slot 41, through which the arm 35 extends.

Extending from the bottom of the board 37 are terminals 42 for connecting the coil leads 30 to the receiver in the plane.

A speed regulating mechanism in the form of a flipper 43 is loosely connected to the insulating member, as by a screw 44, and includes an upper pawl 45 and a lower pawl 46. Also attached to the member 37 is a contact 47, which when engaged by spring 48 will close a circuit to leads 49. The purpose for these elements will become more clear as the description proceeds.

In the lower left portion of Fig. 2, there is shown a wheel 50 provided with teeth 51 and a central hole 52, through which the driving shaft 14 passes, to be secured as by a nut 53 so that the wheel 50 will turn with the shaft 14. In its assembled position, the wheel is disposed a small distance from the member 37 by a tubular spacer 54, through which the driving member 14 also passes. Also, in its assembled position, the teeth 51 are positioned to engage alternately upon rotation the upper pawl 45 and the lower pawl 46 of the flipper 43. Thus as the wheel rotates the speed regulating mechanism will rock back and forth a short distance about the pivot screw 44, and as a result of its moment of inertia the flipper 43 will decrease the normal angular velocity of the wheel a slight amount.

Figure 3:
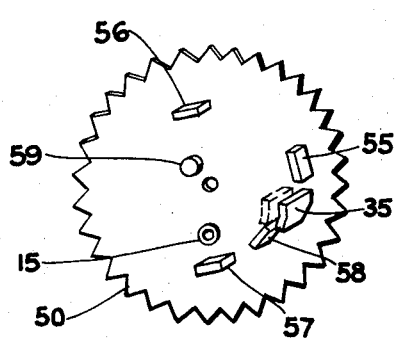
Fig. 3 is an enlarged perspective back view of the wheel of the escapement mechanism showing the stops on its back face and their relation to the engaging arm.

The back face of the wheel 50 is more clearly shown in the view of Fig. 3. A neutral stop 55 projects from a location on a first given inner radius, and it is disposed such that it will engage the arm 35 when the latter is in its first position as illustrated by the solid lines. Three control stops are located on a second given inner radius and are disposed such that they will engage the arm 35 when it is in its dotted line or second given position. These stops consist of a left rudder control stop 56, a right rudder control stop 57, and an auxiliary control stop 58. The number of these control stops and their particular angular position on the second given radius may be varied according to the particular mechanisms to be controlled, the linkage system being used, and the time spacing desired between pulses. For clarity in explaining the operation of these stops, control stop 56 has been shown disposed 180° apart from control stop 57, although in practical application they might be located otherwise.

There is also shown in Fig. 3 an auxiliary contact button 59 which is positioned such that in a given position of the wheel, as determined by auxiliary control stop 58 engaging arm 35, it will press against spring 48 on the member 37 of Fig. 2, to close contact 47 and complete the circuit to leads 49.

Figure 5:
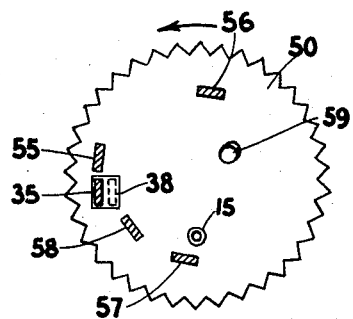
Fig. 5 is an enlarged back view of the wheel (looking through the front face), a cross section of the arm and retaining slot being superimposed thereon, showing the relationship of the stops to the arm when the wheel is in a neutral position.

In the assembled position, the wheel 50 is normally driven to rotate in one direction by the driving shaft 14. The various stops will check or stop the rotation of the wheel in various given positions depending on the desired rudder position. This operation may be more clearly understood by reference to Figs. 5, 6, 7, and 8. In those figures, the same numerals are used to designate similar parts. In Fig. 5, the wheel is shown in the same position as Fig. 3, although in a reverse view. This is the neutral position or the position when no signal is coming from the transmitter 21. The wheel 50 is checked in this position by the arm 35 engaging the neutral stop 55.

When the operator on the ground desires to operate the rudder 11 to the left, for example, he will actuate the transmitter 21, thereby sending a single signal pulse to the receiving circuitry in the plane. As a result the electromagnet 25 will be energized and the arm 35 will move to its second given position. When the arm 35 is in its second position, it will have moved to the dotted line position in Fig. 5, which corresponds to its dotted line position in Fig. 4. In so doing, the driving energy source or rubber band 16, which is normally tending to rotate the wheel counter-clockwise in the direction of the arrows, will rotate the wheel 50 a quarter of a turn until the control stop 56 comes into contact with the arm 35. The wheel will then be in the position of Fig. 6, and it will continue to remain checked in this position so long as the transmitter 21 is being operated to send a signal energizing the electromagnet 25.

At the same time the wheel 50 is rotating a quarter of a turn, it will also rotate the attached control rod 15 a quarter of a turn, thereby causing the control rod 12 to move the rudder 11 to the left, by transmitting the motion through the linkage system 18.

Figure 6:
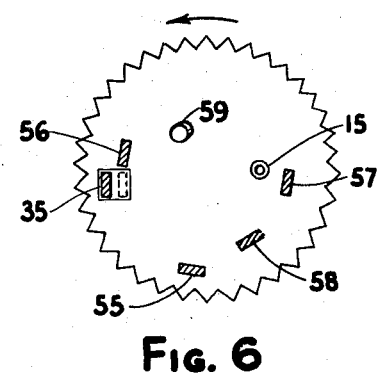
Fig. 6 is a view similar to that of Fig. 5 when the wheel is in a first control position.

Upon stopping the signal from the transmitter 21, the electromagnet 25 will be deenergized and the arm 35 will be moved back to the solid line position in Fig. 6 by the spring 33 and the wheel will be free to turn until neutral stop 55 again engages the arm 35. The wheel will then have completed a full revolution and the wheel will again be in its neutral position of Fig. 5.

Figure 7:
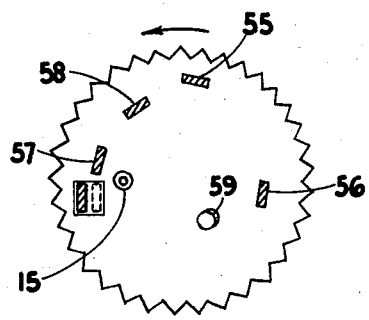
Fig. 7 is a view similar to Fig. 5 when the wheel is in a second control position.
Figure 8:
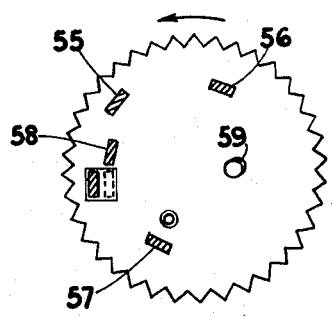
Fig. 8 is a view similar to that of Fig. 5 when the wheel is in an auxiliary control position.

If the operator desires to operate the rudder 11 to the right, he merely transmits two signal pulses in relatively rapid succession. On the first signal pulse, the arm 35 will move to the dotted line position of Fig. 5, and the wheel will move to the right rudder position of Fig. 6. Upon stopping the first signal pulse, the electromagnet will be deenergized and the arm 35 will move back to the solid line position. By quickly transmitting the second signal pulse, the arm 35 will be actuated back to the dotted line position of Fig. 7 in time to engage the control stop 57 and check further movement of the wheel. In this position, the wheel will be in the right rudder position as shown in Fig. 7, having rotated three-quarters of a turn from its neutral position of Fig. 5. The control rod 15 will similarly operate the linkage system 18 and rudder control rod 12 to move the rudder to the right, where it will remain as long as the second signal pulse is being received in the plane.

Upon release of the second signal pulse, the wheel will rotate the remaining quarter of a turn until the neutral stop 55 again engages the arm 35, now in its solid line position, and the wheel will again be in its neutral position of Fig. 5.

If it is desired to use the wheel to operate an auxiliary control circuit on the airplane 10, contact means in the form of the control button 59, may be attached to the wheel and the additional auxiliary control stop 58 may be provided. By merely releasing the second pulse, which has brought the wheel into the position of Fig. 7, and quickly sending a third pulse, the arm 35 will move first to the solid line position in Fig. 7 and then quickly back to its dotted line position in time to engage the auxiliary control stop 58. When the arm engages stop 58, the wheel will be checked in the position of Fig. 8.

In this position of the wheel, the contact button 59 is so disposed that it will press against the spring 48 of Fig. 2 to close the contact 47 and connect the leads 49. The leads 49, in turn, may be connected to an electrically operated mechanism in the plane. The auxiliary circuitry connected to leads 49 (not shown) in the plane, when the auxiliary control stop 58 is used, should include a signal energized, normally open contact in order that the auxiliary circuit will not be energized unless the contact button 59 is engaging the spring 48 at the same time a signal is being transmitted. This arrangement will prevent closing of the auxiliary circuit when the wheel 50 is being rotated to operate the main controls, as the left and right rudder.

It will be apparent that with a mechanical escapement of this type, timing is necessarily of some importance. Although the pulses may be as long as desired, it is necessary that the spacing or off-time between pulses be short in order that the proper control stop be engaged by the arm 35. It is for this reason that some type of speed regulating mechanism is normally needed for practical operation in order to retard the normal high rotational speed of the wheel.

The speed regulating mechanism in this embodiment is, as has been described, in the form of a flipper 43 with an upper pawl 45 and a lower pawl 46. Pawls 45 and 46, as they rock back and forth about screw 44, while alternately engaging the teeth 51 of the wheel during its rotation, tend to slow down the rotational speed of the wheel sufficiently to permit proper human operation of the controls through signal pulses from the transmitter.

An important inventive feature of this improved escapement mechanism is the provision of the wheel which incorporates both control stops and speed regulating means. The radial spacing of the stops are held to constant and close tolerances in view of the use of an integral wheel. Thus stresses and strains will not appreciably change such spacing and accurate positioning with reference to the arm may be maintained. Yet these wheels may be accurately produced in large quantities. Further, the speed regulating mechanism will control the rate at which the wheel and thus the stops move so that given time spaced signals will insure constant and reliable operation.

It will be thus seen that the escapement mechanism of the present invention provides a multi-position and self-neutralizing or automatic return control unit of simple yet precise construction.

What is claimed is:

1. An escapement mechanism for a signal controlled device having a driving energy source, comprising: actuating means responsive to said signal for operating an arm from a first given position to a second given position; supporting means for securing said actuating means in said device; a driving member journalled in said supporting means and adapted for connection to said driving energy source; a wheel connected for rotary movement to said driving energy source, said wheel having at least one neutral stop on a given first inner radius and at least one control stop on a different given second inner radius, said stops being positioned such that said neutral stop will engage said arm in its first position and said control stop will engage said arm in its second position upon rotation of said wheel, whereby in response to said signal, said wheel will rotate until said control stop engages said arm and whereby upon cessation of said signal, said wheel will rotate until said neutral stop engages said arm.

2. An escapement mechanism according to claim 1, in which speed regulating means are attached to said supporting means, said speed regulating means being positioned to retard rotary movement of said wheel.

3. An escapement mechanism for a radio controlled device having a driving energy source, comprising: electromagnetic means having terminals adapted for connection into receiving circuitry in said device, whereby said electromagnetic means may be energized by a given electrical signal; a pole piece positioned adjacent said electromagnetic means and adapted for hinged movement upon energization of said electromagnetic means, said pole piece having an extending arm disposed in a given first position when the electromagnetic means is not energized and disposed in a given second position when the electromagnetic means is energized; supporting means for securing said electromagnetic means and said pole piece in said device; a driving member journaled in said supporting means and adapted for connection to said driving energy source; a wheel connected for rotary movement to said driving member; said wheel having on one face at least one neutral stop on a given first inner radius and at least one control stop on a different given second inner radius, said stops being positioned such that said neutral stop will engage said arm in its first position and said control stop will engage said arm in its second position upon rotation of said wheel, whereby in response to said signal, said wheel will rotate until said control stop engages said arm, and whereby upon cessation of said signal, said wheel will rotate until said neutral stop engages said arm.

4. An escapement mechanism according to claim 3, in which speed regulating means are attached to said supporting means, said speed regulating means being positioned to retard rotary movement of said wheel.

5. An escapement mechanism according to claim 4 in which said wheel has teeth notched around its periphery and in which said speed regulating means engages said teeth.

6. An escapement mechanism according to claim 5 in which said speed regulating means comprises a flipper; said flipper having an upper and lower pawl adapted to alternately engage said teeth as the wheel rotates.

7. An escapement mechanism according to claim 3 including means connected to said wheel for operating controls in said device when said control stop engages said arm.

8. An escapement mechanism according to claim 7 in which contact means are provided on said supporting means, and in which said wheel has a projecting contact button located so as to close said contact means when said control stop engages said arm.

9. An escapement mechanism for a radio controlled device having a driving energy source, comprising: electromagnetic means having terminals adapted for connection into receiving circuitry in said device, whereby said electromagnetic means may be energized by a given electrical signal; a pole piece positioned adjacent said electromagnetic means and adapted for hinged movement upon energization of said electromagnetic means, said pole piece having an extending arm disposed in a given first position when the electromagnetic means is not energized and disposed in a given second position when the electromagnetic means is energized; supporting means for securing said electromagnetic means and said pole piece in said device; a driving member journaled in said supporting means and adapted for connection to said driving energy source; a wheel connected for rotary movement to said driving member; said wheel having on one face at least one neutral stop on a given first inner radius and at least one control stop on a different given second inner radius, said stops being positioned such that said neutral stop will engage said arm in its first position and said control stop will engage said arm in its second position upon rotation of said wheel; contact means provided on said supporting means; a projecting contact button provided on said wheel and so located as to close said contact means when said control stop engages said arm.

References Cited in the file of this patent

UNITED STATES PATENTS

| 1,050,282 | Lipscomb | Jan. 14, 1913 |
| 1,988,983 | Kohler | Jan. 22, 1935 |
| 2,324,163 | Jaccard | July 13, 1943 |

FOREIGN PATENTS

| 704,252 | Great Britain | Feb. 17, 1954 |